United States Patent
Penth et al.

(12) 
(10) Patent No.: US 6,299,778 B1
(45) Date of Patent: Oct. 9, 2001

(54) CATALYTICALLY ACTIVE PERMEABLE COMPOSITE MATERIAL, METHOD FOR PRODUCING SAID COMPOSITE MATERIAL, AND USE OF THE SAME

(75) Inventors: Bernd Penth, Lebach; Christian Hying, Rhede; Mark Duda, Marl; Gerhard Hoerpel, Nottuln; Adolf Kuehnle, Marl, all of (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 0 days.

(21) Appl. No.: 09/308,221

(22) PCT Filed: Sep. 18, 1998

(86) PCT No.: PCT/EP98/05938

§ 371 Date: Jul. 28, 1999

§ 102(e) Date: Jul. 28, 1999

(87) PCT Pub. No.: WO99/15272

PCT Pub. Date: Apr. 1, 1999

(30) Foreign Application Priority Data

Sep. 20, 1997 (DE) .............................. 197 41 498
Mar. 18, 1998 (DE) .............................. 198 11 708
Mar. 18, 1998 (DE) .............................. 198 12 035
May 8, 1998 (DE) .............................. 198 20 580
Jun. 3, 1998 (DE) .............................. 198 24 666

(51) Int. Cl.[7] .......................... B01D 6/100; B01D 71/02; B01D 71/04
(52) U.S. Cl. ................ 210/650; 210/490; 210/500.26; 210/500.25; 264/45.1; 427/372.2; 428/307.7; 55/523; 55/524; 204/554
(58) Field of Search ................ 210/500.25, 500.26, 210/490, 505, 508, 510.1; 264/45.1, 44, 46.4; 428/327.7; 427/372.2; 485/920; 55/423, 424; 204/554

(56) References Cited

U.S. PATENT DOCUMENTS 4,923,608 * 5/1990 Flottmann et al. .
4,946,592 * 8/1990 Galaj et al. .
5,059,366 * 10/1991 Galaj et al. .
5,376,442 * 12/1994 Davidson et al. .
5,885,657   3/1999 Penth .

FOREIGN PATENT DOCUMENTS

0263468 * 10/1987 (EP) .
0332789 *  3/1988 (EP) .
0426546 * 10/1990 (EP) .
0585152 *  7/1993 (EP) .
0778076 * 11/1996 (EP) .
96/00198 *  1/1996 (WO) .

OTHER PUBLICATIONS

A. Julbe et al, The sol–gel approach to prepare candidate microporous inorganic membranes for membrane reactors, Journal of Membrane Science, 77 (1993) 137–153, Elsevier Science Publishers B. V., Amsterdam.*

* cited by examiner

Primary Examiner—Ana Fortuna
(74) Attorney, Agent, or Firm—Oblon, Spivak, McClelland, Maier & Neustadt, P.C.

(57) ABSTRACT

The invention relates to a catalytically active, permeable composite material, a method for producing said composite material, and the use of the composite material. The inventive composite material can be used for separating mixtures of materials. The fact that various catalytically active substances can be incorporated into the material in various ways makes it highly flexible in terms of possible applications with properties which can be adapted to the particular purpose of an application. The inventive composite material can be used as a catalytically active membrane electrode, for example. According to the invention, the material is obtained by solidifying a suspension on and in a porous, permeable support. The production of the material requires either a very short period of heat treatment at temperatures of around 400° C. or treatment for a longer period at very mild temperatures of below 100° C.

76 Claims, No Drawings

CATALYTICALLY ACTIVE PERMEABLE COMPOSITE MATERIAL, METHOD FOR PRODUCING SAID COMPOSITE MATERIAL, AND USE OF THE SAME

A claim is laid to a catalytically active, permeable composite, a process of production and use of this permeable composite.

There are several different applications known where composites containing ceramic materials are used.

The advantage of composites containing ceramic material is in the fact that ceramic coatings are chemically inert against most chemical substances such as organic substances and besides this are generally resistant to acids or caustic solutions. For this reason metals are often coated with ceramic materials in order to protect the metal from chemical attack. In addition to this, the porous surface of a composite coated with a ceramic material increases the abrasion resistance of paints or protective coatings that are applied at a later date. Because of their porous surface, ceramic materials themselves are very suitable for use as membranes or filters.

The disadvantage of ceramic materials or composites containing ceramic materials is the brittleness of the ceramic material. Metals coated with ceramic material are therefore very susceptible to shocks, and the ceramic coating, rarely survives mechanical stresses without the surface of the ceramic material being damaged. Since bending such a ceramic composite also damages the ceramic coating, the fields of application of such ceramic composites are limited at the present time In spite of the disadvantages, ceramic composites are often used in filtration and membrane technology.

EP 0358 338 describes a process in which an aqueous solution containing a metallic oxide sol is applied to and stabilized on a—preferably smooth metallic—surface, thus protecting this surface with a ceramic coating. To improve the bond between the ceramic coating and the surface to be protected a metallic oxide powder and/or a bond-improving agent can be added to the aqueous solution. The process does not describe the coating of permeable carrier materials.

WO 96/00198 shows the production of ceramic coatings on surfaces made from different materials. These coated materials can be used as membranes in micro-filtration. In this process, titanium dioxide sol is dispersed with aluminum oxide powder, whereby hydrochloric acid is used as a peptizing agent, U.S. Pat. No. 4,934,139 shows a process for the production of ceramic membranes for ultra-filtration and micro-filtration. For the production of such ceramic membranes a sol or a particle suspension is applied to a metallic carrier and sintered. The porous carrier can be stainless-steel-sintered metal or stainless steel mesh where metallic particles have been sintered into the gaps. Metallic mesh with gaps of more than 100 $\mu$m cannot be produced using this process without sintering in metallic particles. The process prevents the suspension or the sol from penetrating the gaps in the carrier material.

In U.S. Pat. Nos. 5,376,442 and 5,605,628, an organic bonding agent is worked into the coating solution to bridge the gaps in the carrier material. This bonding agent must be removed again during stabilization, which can lead to irregularities in the ceramic material surface and/or structure.

With the above-mentioned processes it is not possible to produce catalytically active composites containing ceramic material, where ceramic material is contained in and on the carrier material, without the ceramic coating being damaged during production.

The basis of the invention at issue is therefore to make available a catalytically active composite that contains ceramic components on and in the carrier and to find a simple and economic process of producing such a composite.

Surprisingly, it was found to be the case that a catalytically active, permeable composite based on at least one perforated and permeable carrier containing at least one inorganic component on at least one side of the carrier and inside the carrier, which essentially contains a compound consisting of a metal and at least one element from group III to VII of the periodic system, can be produced simply and at a reasonable price.

Subject matter of the invention at issue is therefore a catalytically active, permeable composite based on at least one perforated and permeable carrier containing at least one inorganic component on at least one side of the carrier and inside the carrier, which essentially contains a compound consisting of a metal and at least one element from group III to VII of the periodic system.

Further subject matter of the invention at issue is a catalytically active, permeable composite, which is obtained by application of a suspension that contains at least one inorganic compound, which is a compound of at least one metal with at least one element from group III to VII of the periodic system, and a sol on a perforated and permeable carrier, which is then heated at least once to stabilize the suspension containing at least one inorganic component onto or into or onto and into the carrier.

Further subject matter of the invention at issue is a process to produce a catalytically active, permeable composite as claimed in one of claims 1 to 36, wherein at least one suspension, which contains at least one inorganic component from at least one compound of at least one metal with at least one of the elements of group III to VII of the periodic system, is applied in and on at least one perforated and permeable carrier, and is stabilized in or on or in and on the carrier material when the suspension is subsequently heated at least once.

Subject matter of the invention at issue is furthermore the use of a composite according to at least one of the claims 1 to 36 as a filter to separate mixtures.

Permeable composites or carriers respectively are materials that are permeable for substances with a particle size of between 0.5 nm and 500 $\mu$m, depending on the style of execution of the composite or carrier respectively. The substances can be gaseous, liquid or solid or in a mixture of these states of aggregation.

The composite according to invention has the advantage that inorganic components can be stabilized on and in a perforated and permeable carrier, which allow this composite to be permeable and catalytically active, without the coating being damaged during production.

The composite according to invention also has the advantage that, although it partly consists of a ceramic material, it can be bent to a radius of up to 1 mm. This property enables an especially simple process of producing this composite, as the composite created by coating with a ceramic material can be wound on or off a roll. Furthermore, this property enables the adaptation of the composite according to invention to various module shapes such as, for example, spiral modules, flat modules or pocket modules when used as a membrane.

The process of producing the composite according to invention also has the advantage that carriers with perforated surfaces with a maximum gap size of 500 μm can be coated. The especially careful conditions during stabilization of the suspension in or on the carrier enable carrier materials to be used that cannot be subjected to high temperatures or only subjected to high temperatures for a very short time.

The catalytically active composite according to invention, which is produced according to the process that is the subject of the invention, is ideally suited for use as a filter, catalyst, or membrane. The possibility of also being able to use carriers that have gaps with a size of up to 500 μm allows the use of exceptionally reasonably priced materials. The particle size used in combination with the gap size of the carrier material used allows the pore size and/or the pore size distribution to be easily adjusted in the composite so that special, catalytically active membranes can be produced for special applications. Some of these applications cannot be carried out without the composite according to invention.

The catalytically active composite according to invention is described in the following as an example, without the composite according to invention being limited to this style of execution.

The catalytically active, permeable composite according to invention has a basis of at least one perforated and permeable carrier. On at least one side of the carrier and inside the carrier, the carrier contains at least one inorganic component that contains essentially at least one compound consisting of at least one metal, metalloid or composition metal with at least one element from group III to VII of the periodic system. The inside of a carrier in the invention at issue means hollows or pores in a carrier.

The catalytically active, permeable composite according to invention can be obtained by the application of a suspension containing at least one inorganic component, which contains a compound of at least one metal, metalloid, or composition metal with at least one element from group III to VII of the periodic system, and a sol onto a perforated and permeable carrier, which is subsequently heated at least once to stabilize the suspension containing at least one inorganic component on or in or on and in the carrier.

However, according to invention, the catalytically active, permeable composite can also be obtained by chemical vapor deposition, impregnation, or co-precipitation.

According to invention, the composite can be permeable for gases, solids, or liquids, especially for particles with a size of between 0.5 nm and 10 μm.

The gaps can be pores, mesh, holes, crystal lattice gaps or hollows. The carrier can contain at least one material from the following: carbon, metals, alloys, glass, ceramic materials, minerals, plastics, amorphous substances, natural products, composites or at least one combination of these materials. The carriers, which can contain the above-mentioned materials, could have been modified by a chemical, thermal, or mechanical treatment or a combination of treatments. The composite preferably contains a carrier, which contains at least one metal, a natural fiber or a plastic, which has been modified by at least one mechanical deformation or treatment technology respectively, such as drawing, swaging, flex-leveling, milling, stretching, or forging. It is absolutely preferable that the composite contains at least one carrier, that has at least woven, glued, felted or ceramically bound fibers or at least sintered or glued formed bodies, spheres or particles. In another preferred construction, a perforated carrier can be used. Permeable carriers can also be carriers that become or were made permeable by laser or ion beam treatment.

It can be advantageous, if the carrier contains fibers from at least one of the following materials: carbon, metals, alloys, ceramic materials, glass, minerals, plastics, amorphous substances, natural products, composites or fibers consisting of at least one combination of these materials, such as asbestos, glass fibers, rock wool fibers, carbon fibers, metal wires, steel wires, polyamide fibers, coconut fibers, coated fibers. Preferably carriers are used that at least contain woven fibers made of metal or alloys. Metal fibers can also be wires. Especially preferable is a composite containing a carrier that has at least one mesh made of steel or stainless steel, such as, for example, steel wire, steel fibers, stainless steel wire, or stainless steel fiber meshes produced by weaving. The preferable mesh size is between 5 and 500 μm, the especially preferred mesh size is between 50 and 500 μm and the very specially preferred mesh size is between 70 and 120 μm.

However, the composite carrier can also have at least one expanded metal with a pore size of between 5 and 500 μm. According to invention, the carrier can also have at least one granular sintered metal, one sintered glass or one metal web with a pore width of between 0.1 μm and 500 μm, preferably between 3 and 60 μm.

The composite according to invention preferably has at least one carrier that has at least one of the following: aluminum, silicon, cobalt, manganese, zinc, vanadium, molybdenum, indium, lead, bismuth, silver, gold, nickel, copper, iron, titanium, platinum, stainless steel, steel, brass, an alloy of these materials or a material coated with Au, Ag, Pb, Ti, Ni, Cr, Pt, Pd, Rh, Ru and/or Ti.

The inorganic component contained in the composite according to invention can contain at least one compound of at least one metal, metalloid or composition metal with at least one element from group III to VII of the periodic system or at least one mixture of these compounds. Moreover, the compounds of metals, metalloids or composition metals can contain at least elements of the transitional element groups and of group III to V of the periodic system or at least elements of the transitional element groups or of group III to V of the periodic system, whereby these compounds have a particle size of between 0.001 and 25 μm. Preferably the inorganic component contains at least one compound of an element of group III to VII of the transitional element groups or at least one element of group III to V of the periodic system with at least one of the elements Te, Se, S, O, Sb, As, P, N, Ge, Si, C, Ga, Al or B or at least one compound of an element of group III to VIII of the transitional element groups and at least one element of group III to V of the periodic system with at least one of the elements Te, Se, S, O, Sb, As, P, N, Ge, Si, C, Ga, Al or B or a mixture of these compounds. It is especially preferred if the inorganic component contains at least one compound of at least one of the elements Sc, Y, Ti, Zr, V, Nb, Cr, Mo, W, Mn, Fe, Co, B, Al, Ga, In, Tl, Si, Ge, Sn, Pb, Sb or Bi with at least one of the elements Te, Se, S, O, Sb, As, P, N, C, Si, Ge or Ga, such as, for example. $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium aluminum garnet, or one of these elements itself. The inorganic component can also have alumosilicates, aluminumphosphates, zeolites or partially substituted zeolites, such as, for example, ZSM-5, Na-ZSM-5 or Fe-ZSM-5 or amorphous microporous mixed oxide systems, which can contain up to 20% non-hydrolyzable organic compounds, such as, for example, vanadium oxide-silicium oxide-glass or aluminum oxide-silicium oxide-methyl silicium sesquioxide-glasses.

Preferably there is at least one inorganic component in a particle size fraction with a particle size of between 1 and 250 nm or with a particle size of between 260 and 10000 nm.

It can be advantageous if the composite according to invention has at least two particle size fractions of at least one inorganic component. The particle size proportion of the particle size fractions in the composite can be between 1:1 and 1:10000, preferably between 1:1 and 1:100. The proportion of ingredients of the particle size fraction in the composite can preferably be between 0.01:1 and 1:0.01.

The permeability of the composite according to invention can be limited by the particle size of the inorganic component used to particles with a certain maximum size.

The suspension containing at least one inorganic component, which allows the composite according to invention to be obtained, can contain at least one liquid from the following: water, alcohol and acid or a combination of these liquids.

The composite according to invention contains at least one catalytically active component. The catalytically active component can be identical to the inorganic component. This especially applies when the inorganic component has catalytically active centers on the surface.

For a catalytically active component, the composite according to invention preferably contains at least one inorganic material, at least one metal or at least one organometallic compound, which has catalytically active centers on its surface. It is especially preferable if the composite has a zeolite as a catalytic component, such as, for example, ZSM-5, Fe-ZSM-5, silicalite or an amorphous microporous mixed oxide, as, for example, described in DE 195 45 042 and/or DE 195 06 843, such as, for example, vanadium oxide-silicium oxide-glass or aluminum oxide-silicium oxide-methyl silicium sesquioxide-glasses.

However, as a catalytically active component, the composite can contain have at least one oxide of at least one of the elements Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr and Ba.

In a special style of execution of the catalytically active, permeable composite according to invention, this contains at least titanium suboxide.

It can also be advantageous if the composite has at least one metal compound from the compounds of the metals Pt, Rh, Ru, Ir, Au, Ag, Os, Re, Cu, Ni, Pd and Co or at least one metal from the metals Pt, Rh, Ru, Ir, Au, Ag, Os, Re, Cu, Ni, Pd and Co as a catalytic component.

In an especially preferred style of execution of the composite according to invention, this composite can be constructed in such a way that it can be bent without the inorganic components stabilized on the inside of the carrier and on the carrier being destroyed. The composite according to invention is preferably flexible to a smallest radius of up to 1 mm.

The process according to invention for the production of a composite according to invention is described in the following as an example without being limited to this example.

In the process according to invention for the production of the composite according to invention, at least one suspension containing at least one inorganic component consisting of at least one compound of one metal, metalloid or composition metal with at least one element from group III. to VII of the periodic system and one sol is applied into and/or onto at least one perforated and permeable carrier. The suspension is stabilized on or in or on and in the carrier material by being heated at least once.

When implementing the process according to invention it could be advantageous to apply the suspension onto and into or onto or into at least one carrier by stamping on, pressing on or in, rolling on, applying with a blade or a brush, dipping, spraying or pouring.

The perforated and permeable carrier can contain at least one of the following materials: carbon, metals, alloys, glass, ceramic materials, minerals, plastics, amorphous substances, natural products, composites or at least one combination of these materials.

The suspension used, which can contain at least one inorganic component and at least one metallic oxide sol, at least one metalloid oxide sol or at least one composition metallic oxide sol or a mixture of these sols, can be produced by suspending at least one inorganic component in at least one of these sols. It can be advantageous if the suspension has at least one catalytically active component. The catalytically active component can be identical to the inorganic component.

The sols are obtained by hydrolyzing at least one metallic compound, at least one metalloid compound or at least one composition metallic compound with one liquid, one gas or one solid, whereby it can be advantageous if as a liquid for hydrolysis of the compound to be hydrolized water, alcohol or an acid or a combination of these liquids or as a solid ice or as a gas water vapor is used. It could also be advantageous to place the compound to be hydrolyzed in at least one alcohol or at least one acid or a combination of these liquids before hydrolysis. As a compound to be hydrolyzed it is preferable to hydrolyze at least one metal nitrate, one metal chloride, one metal carbonate, one metal alcoholate compound or at least one metalloid alcoholate compound. Especially preferable is at least one metal alcoholate compound, one metal nitrate, one metal chloride, one metal carbonate or at least one metalloid alcoholate compound from compounds of the elements Ti, Zr, Al, Si, Sn, Ce and Y or the lanthanides and actinides, such as, for example, titanium alcoholates, such as, for example, titanium isopropylate, silicium alcoholates, zirconium alcoholates, or a metallic nitrate, such as, for example, zirconium nitrate.

It can be advantageous to carry out the hydrolysis of the compounds to be hydrolyzed with at least half the mol ratio water, water vapor or ice in relation to the hydrolyzable group of the hydrolyzable compound.

For peptizing, the hydrolyzed compound can be treated with at least one organic or inorganic acid, preferably with a 10 to 60% organic or inorganic acid, especially preferred with a mineral acid from the following: sulfuric acid, hydrochloric acid, perchloric acid, phosphoric acid and azotic acid or a mixture of these acids.

Not only sols produced as described above can be used, but also commercially available sols such as titanium nitrate sol, zirconium nitrate sol or silica sol.

It can be advantageous if at least one inorganic component having a particle size of between 1 and 10000 nm is suspended in at least one sol. Preferably an inorganic component is suspended containing at least one compound from the following: metallic compounds, metalloid compounds, composition metallic compounds and metallic mixture compounds with at least one of the elements from group III to VI of the periodic system or at least a mixture of these compounds. It is especially preferred if at least one inorganic component is suspended, which contains at least one compound from the oxides of the transition element groups or from the elements of group III to V of the periodic system, preferably oxides from the following elements: Sc, Y, Ti, Zr, Nb, Ce, V, Cr, Mo, W, Mn, Fe, Co, B, Al, In, Tl, Si, Ge, Sn, Pb and Bi, such as, for example, $Y_2O_3$, $ZrO_2$, $Fe_2O_3$, $Fe_3O_4$, $SiO_2$, $Al_2O_3$.

Preferably the percentage by mass of the suspended component should be 0.1 to 500 times the hydrolyzed compound used.

It can be advantageous if at least one catalytically active component is added to the sol.

It can also be advantageous if at least one catalytically active component, which has a particle size of 1 to 10000 nm, is suspended in a sol. Preferably at least one catalytically active component is suspended, which has at least one compound chosen from metallic compounds, metalloid compounds, composition metallic compounds and metal mixture compounds with at least one element of group III to VII of the periodic system or organic compounds or at least a mixture of these compounds. Especially preferred for suspension is at least one catalytically active component, which contains at least one compound from alumosilicates, aluminumphosphates, zeolites or partially substituted zeolites, such as, for example, ZSM-5, Na-ZSM-5 or Fe-ZSM-5 or amorphous microporous mixed oxide systems, which can contain up to 20% non-hydrolyzable organic compounds such as, for example, vanadium oxide-silicium oxide-glass or aluminum oxide-silicium oxide-methyl silicium sesquioxide-glasses.

Preferably the percentage by mass of the suspended component should be 0.1 to 500 times the hydrolyzed compound used.

The fracture resistance in the composite according to invention can be optimized by a suitable choice of the particle size of the suspended compounds in dependence on the size of the pores, holes or gaps of the perforated permeable carrier, but also by the layer thickness of the composite according to invention as well as by the proportional ratio of sol, solvent and metallic oxide.

When using a mesh with a mesh width of, for example, 100 µm, the fracture resistance can be increased by the preferable use of suspensions containing a suspended compound with a particle size of at least 0.7 µm. In general, the ratio of particle size to mesh or pore size respectively should be between 1:1000 and 50:1000. The composite according to invention can preferably have a thickness of between 5 and 1000 µm, especially preferable is a thickness of between 50 and 150 µm. The suspension consisting of sol and compounds to be suspended preferably has a ratio of sol to compounds to be suspended of 0.1:100 to 100:0.1, preferably of 0.1:10 to 10:0.1 parts by weight.

According to invention, the suspension that is present on or in or on and in the carrier can be stabilized by heating this composite to between 50 and 1000° C., In a special variant, the composite is subjected to a temperature of between 50 and 100° C. for 10 minutes to 5 hours. In a further special style of execution, the composite is subjected to a temperature of between 100 and 800° C. for 1 second to 10 minutes.

Heating the composite according to invention can be carried out by means of warmed air, hot air, infrared radiation, microwave radiation, or electrically generated heat. In a special style of execution of the process according to invention it can be advantageous if heating of the composite is carried out using the carrier material as electric resistance heating. For this purpose, the carrier can be connected to an electrical power source by at least two contacts. Depending on the strength of the power source, voltage released, and inherent resistance of the conductive carrier, the carrier heats up when the power is switched on, and the suspension that is present in and on the surface of the carrier can thus be stabilized.

In a further preferred style of execution of the process according to invention stabilization of the suspension can be achieved by applying the suspension onto or into or onto and into a preheated carrier thus stabilizing it immediately upon application.

In a further special style of execution of the process according to invention it can be advantageous that at least one carrier is rolled from a roll and—at a speed of between 1 m/h and 1 m/s—runs through at least one device that applies the suspension onto or into or onto and into the carrier and through at least one other device that enables the suspension to be stabilized onto or into or onto and into the carrier by heating, and that the composite produced in this way is rolled onto a second roll. In this way it is possible to produce the composite according to invention in a continuous process.

In a further special style of execution of the process according to invention it can be advantageous, if a ceramic or an inorganic layer is applied to the carrier, which can be a composite, a composite according to invention or a composite produced by the process according to invention. To this purpose, a green (unsintered) layer of ceramic material or an inorganic layer, for example, which can, for example, be on an auxiliary film, can be laminated onto the carrier or the composite treated with another suspension as described above. This composite can be stabilized by heating, for example, by infrared radiation or in a kiln.

The green ceramic material layer that is used preferably contains nanocrystalline powder from at least one metalloid oxide or metallic oxide, such as, for example, aluminum oxide, titanium dioxide or zirconium dioxide. The green layer can also contain an organic bonding agent.

By using a green ceramic material layer it is a simple matter to provide the composite according to invention with an additional ceramic layer, which—according to the size of the nanocrystalline powder used—limits the permeability of the composite produced in this way to smallest particles.

Preferably, the green layer of nanocrystalline powder has a particle size of between 1 and 1000 nm. If nanocrystalline powder with particle sizes of between 1 and 10 nm is used, the composite according to invention, onto which an additional ceramic layer has been applied, has a permeability for particles with a size corresponding to the particle size of the powder that was used. If nanocrystalline powder with a size of more than 10 nm is used, the ceramic layer is permeable for particles that are half as large as the particles of the nanocrystalline powder that was used.

By applying at least one other inorganic or ceramic material layer according to invention, a composite according to invention is obtained that has a pore gradient. To produced composites with a defined pore size, it is also possible to use carriers, whose pore or mesh size respectively is not suitable for the production of a composite with the required pore size, if several layers are applied. This can, for example, be the case when a composite with a pore size of 0.25 µm is to be produced using a carrier with a mesh width of more than 300 µm. To obtain such a composite it can be advantageous to apply at least one suspension on the carrier, which is suitable for treating carriers with a mesh width of 300 µm, and stabilizing this suspension after application. The composite obtained in this way can then be used as a carrier with a smaller mesh or pore size respectively. Another suspension, for example, that contains, for example, a compound with a particle size of 0.5 µm can be applied to this carrier.

The fracture indifference of composites with large mesh or pore widths respectively can also be improved by applying suspensions to the carrier that contain at least two suspended compounds. Preferably, suspended compounds are used that have a particle size ratio of 1:1 to 1:10, especially preferred is a ratio of between 1:1.5 and 1:2.5. The proportion by weight of the particle size fraction with the smaller particle size should not exceed a proportion of 50% at the most, preferably 20% and especially preferably 10% of the total weight of the particle size fraction.

In spite of an additional layer of ceramic material or inorganic material, which can contain catalytically active components, being applied to the carrier, the composite according to invention can be flexible.

The composite according to invention can also be produced by placing a carrier, that can be, for example, a composite according to invention or another suitable carrier material, onto a second carrier that can be the same material as the first carrier or another material or two carriers of different permeability or porosity respectively. A spacer, a drainage material or another material suitable for material conduction, for example, a mesh composite, can be placed between the two carrier materials. The edges of both carriers are connected to each other by various processes, for example, soldering, welding or adhering. Adhering can be done with commercially available bonding agents or adhesive tape. The suspension can then be applied to the carrier composite that has been produced in the above-mentioned ways.

In an especially preferred style of execution, the two carriers placed on top of each other with at least one spacer, drainage material or similar material placed between them, can be rolled up before or after joining the edges of the carrier, but preferably after joining. By using thicker or thinner adhesive tape to join the edges of the carrier, the space between the two carrier composites that are placed on top of each other can be influenced during rolling. A suspension as described above can be applied to such carrier composites that have been rolled up in this way, for example, by dipping in a suspension. After dipping, the carrier composite can be freed of surplus suspension with the aid of compressed air. The suspension that has been applied to the carrier composite can be stabilized in the above-mentioned manner. A composite produced in the above-mentioned manner can be used in a wound module as a form-selective membrane.

In another special style of execution of the process according to invention, the above-mentioned carrier composite can also be produced when two carriers and, if intended, at least one spacer are rolled from one roll and then placed on top of each other. The edges can again be joined by soldering, welding or adhesion or other suitable processes of joining flat bodies. The suspension can then be applied to the carrier composite produced in this manner. This can be done, for example, by the carrier composite being sprayed or painted with the suspension or the carrier composite being drawn through a bath containing the suspension. The applied suspension is stabilized according to one of the above-mentioned processes. The composite produced in this way can be wound onto a roll. Another inorganic layer can be applied into and/or onto such a material by a further application and stabilization of a further suspension. Using different suspensions allows the material properties to be adjusted according to wish or intended use respectively. Not only further suspensions can be applied to these composites, but also unsintered ceramic and/or inorganic layers, which are obtainable by lamination in the above-mentioned way. The described style of execution of the process according to invention can be carried out continuously or intermittently, preferably continuously. A composite produced in this way can be used as a form-selective membrane in a flat module.

The carrier in the composite can, depending on the carrier material, be removed again thus creating a ceramic material that has no further trace of carrier material. For example, if the carrier is a natural material such as a cotton fleece, this can be removed from the composite in a suitable reactor by oxidation. If the carrier material is a metal, such as, for example, iron, this carrier can be dissolved by treating the composite with acid, preferably with concentrated hydrochloric acid. If the composite was also made from zeolite, flat zeolite bodies can be produced that are suitable for form-selective catalysis It can be advantageous to use the composite according to invention as a carrier for the production of a composite according to invention.

In a special style of execution of the process according to invention, the dried and stabilized composite can be treated with a solution containing at least one metallic compound, preferably a metallic salt such as $RhCl_3$, after the stabilization of the suspension or ceramic or inorganic layer on and/or in the carrier material. This treatment can, for example, consist of spraying, squirting, painting or rolling the solution containing a metallic compound onto the composite or, for example, by dipping the composite into a solution containing a metallic compound. The composite treated in such a way is dried by heating. Heating can take place as described above. The metallic compound, which is present in and on or in or on the composite after application and drying, is reduced to a metal.

It can be advantageous to reduce the metallic compound present in and/or on the composite to a metal with the help of a reduction agent, preferably with a hydroboron and especially preferably with $NaBEt_3H$, $LiBEt_3H$, $NaBMe_3H$ or $KBPr_3H$. Preferably the composite according to invention, which contains metallic compounds that are to be reduced, is treated with an organic solvent that contains at least one of the hydroorganoborates. Since the salts created form well soluble complexes with the bororganic complexing agents in an organic phase, the composite according to invention is kept virtually free of boron. If the composite contains several metallic salts, then particles can be obtained after reduction, which are true alloys consisting of at least two metals, such as, for example, rhodium-platinum, iron-cobalt-nickel or palladium-platinum alloys.

For compounds to be reduced, metallic compounds from the following can be used: nitrates, halogenides, hydroxides, cyanides, thiocyanides or alcoholates of the metals chromium, manganese, iron, cobalt, nickel, copper, zinc, ruthenium, rhodium, palladium, silver, osmium, iridium, platinum, zinc, cadmium, rhenium or gold or mixtures of these metals or compounds. These compounds can be added to the suspension during the production of the composite according to intention or can be applied after the stabilization of a suspension according to invention on a carrier.

It can also be advantageous to reduce a metallic compound present on or in or on and in the composite to a metal by using the composite as an electrode in an electrolysis.

Catalytically active metals can also be applied into and/or onto the composite by using a composite according to invention without a catalytically active component as an electrode for electrolysis of a precious metalsaliferous solution. In this case it is necessary that the composite contains at least $TiO_2$ as an inorganic component and at least one partially electrically conductive carrier. By connecting a voltage of 2 to 3 volts, the composite becomes electrically conductive because titanium suboxide is formed, which is electrically conductive. Due to the electrolysis, catalytically active precious metal is deposited in and/or on the composite, preferably in very fine particles.

It can be advantageous to use the composite according to invention as a filter to separate material mixtures. It is especially preferable to use the composite according to invention as a filter for separating liquid mixtures, gas mixtures, mixtures containing at least one liquid and at least one gas, mixtures containing at least one solid and at least one liquid, and mixtures containing at least one gas and at least one solid or at least one liquid or one gas. The composite can also be used as a filter in pressurized separation processes.

It is especially advantageous to use a composite according to invention as a membrane for micro-filtration. ultra-filtration or nano-filtration.

It can also be advantageous to use a composite according to invention in catalytic processes. It can be especially advantageous to use the composite as a catalyst carrier, whereby the catalyst carrier has an electric field connected to it and the catalyst carrier is connected as an anode or cathode. The composite can also be used as a catalyst membrane, whereby the catalytic effect of oxygen-ion conductive solid electrolytes is used, which ensues in the oxygen-ion conduction in the electrical field.

If it contains at least one titanium dioxide, the composite according to invention can be used as a catalytically effective membrane or as a catalyst, when by connection to an electrical field a non-stoichiometric titanium-dioxide compound is formed.

By connecting the composite as a cathode, the catalytically reductive effect of the composite can be used. By connecting the composite as an anode, the catalytically oxidative effect of the composite can be used.

It is especially preferable to use the composite according to invention for the catalytic conversion of oxygenous compounds. The composite according to invention can, for example, be used for the reduction of nitrate or nitrite ions in waste water or, for example, for the degradation of ozone in oxygen.

It is especially preferable to use the composite according to invention for oxidation reactions. If $SO_2$ and oxygen are conducted through a composite according to invention, which, for example, contains at least $V_2O_5$, the catalytically active composite converts $SO_2$ into $SO_3$, which can be washed out of a gas containing $SO_2$. It is also possible to oxidize organic compounds by means of the catalytically active composite, for example, aromatic compounds into hydroxy aromatic compounds.

It is also possible to use the composite according to invention as a carrier for the preparation of a composite according to invention.

It can be advantageous to combine preferred styles of execution of the process according to invention with at least one other preferred style of execution of process according to invention. It can also be advantageous to combine preferred styles of execution of the composite according to invention with at least one other special style of execution or form of the composite according to invention. Further styles of execution of the process according to invention, of the composite according to invention and/or further possibilities for using the process according to invention or composite according to invention are opened up to the specialist with knowledge of the invention at issue.

The catalytically active composite, processes for its production and the use of the composite according to invention are described in the following examples without being limited to these examples.

EXAMPLE 1.1

A suspension consisting of 25 g titanium isopropylate was hydrolyzed with 12 g water. The resulting precipitation was subsequently peptized with approx. 35 g azotic acid (25%), and after this was completely dissolved, 10 g titanium dioxide (30 nm; type P25, Degussa) and 3 g titanium dioxide in its anatase form were added, and the suspension was stirred until all agglomerates were completely dissolved. This suspension was applied to a thickness of 20 μm to a permeable ceramic composite with an average pore width of 0.4 μm. After drying and stabilization of the composite by subjecting the composite to a temperature of 450° C. for 2 seconds, the catalytically active composite could be used for photochemical catalytic oxidation reactions. By rolling up the composite and placing the composite in a tubular reactor that has a UV radiator in its center, the effectiveness of the UV radiator (quantum yield, conversion) for the degradation of TOC could be increased enormously.

EXAMPLE 1.2

A permeable composite, as can be obtained by applying a sol of 120 g titanium triisopropylate, 60 g water, 100 g hydrochloric acid (25%) and 280 g aluminum oxide (SC530SG, Alcoa) onto a carrier consisting of a square mesh with a mesh width of 150 μm, was dipped into a solution of 50 g potassium permanganate in 1000 ml water and subsequently dried in a hot airflow at 450° C. During this process, manganese dioxide, which can degrade ozone catalytically, is formed in the pores of the carrier. This catalytically active, permeable composite is used for the catalytic elimination of ozone from the air sucked in by automobiles.

EXAMPLE 1.3

120 g titanium tetraisopropylate was mixed with 140 g de-ionized ice and stirred vigorously until the resulting precipitation was finely dispersed. After adding 100 g of 25% hydrochloric acid, the mixture was stirred until it became clear. 9 g $FeCl_3$ and 3 g $CoCl_2$ as well as 280 g α-aluminum oxide type CT3000SG from Alcoa, Germany, were added and stirred vigorously for several days until all the aggregates are dissolved.

The suspension thus obtained was painted in a layer onto a nickel rib mesh with 90 μm grid width to a thickness of approx. 30–150 μm and stabilized by means of a hot-air drier at 100–150° C. within 10 minutes. During this process, a composite is obtained, which has a mechanically solid, ceramic coating. The macro-structure of this ceramic material consists of α-aluminum oxide and has a pore width of 0.45 μm. On the surfaces of the aluminum oxide particles there are ceramic membranes as a micro-structure, which are only a few micrometers thin. The metallic salts are in the structure and pores of the macro-structure.

The composite was rolled up in a pipe, put in a solution of 150 ml 1.7 molar solution of $LiBEt_3H$ in THF and left there for 10 hours. Subsequently, the composite was taken out of the solution and then first washed with 800 ml THF, then with 1500 ml ethanol and then with a mixture of 800 ml ethanol and 800 ml THF till degassing was over.

EXAMPLE 1.4

In an experiment that was conducted as under example 1.3, a mesh of stainless steel (VA-steel) was used instead of nickel rib mesh. So that this mesh would not be destroyed by chloride ions, nitrates of cobalt and iron were used instead of chlorides and as an acid 140 g of 54% azotic acid was used.

EXAMPLE 1.5

A suspension of 30 g titanium tetraisopropylate was hydrolyzed with 60 g water and subsequently peptized with 45 g sulfuric acid (20%). Subsequently, 90 g aluminum oxide (A16SG, Alcoa) was added and stirred until the agglomerates were completely dissolved. This suspension was applied to a rib mesh with an average mesh width of 50 μm and dried and stabilized at 450° C. within 2 seconds.

The composite obtained in this way was used as an electrode membrane in electrolysis. When feeding an electrical voltage of approx. 2.5 volts to the electrode membrane, which was placed in a precious metal solution, an electrolytic precipitation of the precious metal took place in the pores of the composite. This is only possible by using titanium dioxide as an inorganic component in the composite, since by formation of titanium suboxide at a voltage of more than 2 volts this titanium suboxide becomes electrically conductive. Graphite electrodes were used as a counter electrode. In this way almost all known precious metal catalysts and precious metal catalyst systems (such as, for example, Pt/Rh, Pt/Pd or Pt/Ir) can be precipitated.

EXAMPLE 1.6

A suspension of 30 g titanium tetraisopropylate was hydrolyzed with 60 g water and then peptized with 45 g azotic acid (25%). Subsequently, 30 g titanium dioxide (P25, Degussa) was added and stirred until the agglomerates were completely dissolved. This suspension was applied to a titanium wire netting with an average mesh width of 80 μm and dried and stabilized at 450° C. within 2 seconds. If the composite obtained in this way is connected as a cathode and dipped with a graphite anode into a solution of 1% azotic acid in water, the nitrate is almost completely decomposed within 10 hours at a voltage of 2.1 volts and a current efficiency of 20%.

The composite according to invention is thus well suited for the reduction of nitrate compounds, especially for nitrate degradation in aqueous systems.

EXAMPLE 1.7

If the composite produced according to example 1.6 is connected as a cathode and dipped into a sodium-palladium-tetrachloride/copper-dichloride solution, the palladiun/copper catalyst precipitates at 2V in a fine dispersion on the surface of the composite. If the composite produced in such a way and equipped with a catalyst, again connected as a cathode, is dipped with a graphite anode into a solution of 1% sodium nitrate in water, the nitrate is almost completely decomposed within 3 hours at a voltage of 2.1 volts and a current efficiency of 20%.

The composite according to invention, equipped with a catalyst, is thus excellently suited for the reduction of nitrate compounds, especially for nitrate degradation in aqueous systems.

EXAMPLE 1.8

If the composite produced according to example 1.6 is impregnated with a sodium-palladium-tetrachloride/copper-dichloride solution, the palladium/copper catalyst precipitates according to the deposition-precipitation process in a fine dispersion on the surface of the composite. The liquid-phase reduction was carried out in one variant with sodium formiate at 80° C. and in a second execution variant with sodium hydroboron at room temperature. If the composite produced in such a way and equipped with a catalyst, again connected as a cathode, is dipped with a graphite anode into a solution of 1% sodium nitrate in water, the nitrate is almost completely decomposed within 3 hours at a voltage of 2.1 volts and a current efficiency of 20%.

The composite according to invention, equipped with a catalyst, is thus excellently suited for the reduction of nitrate compounds, especially for the nitrate degradation in aqueous systems.

EXAMPLE 1.9

A suspension consisting of 25 g zirconium isopropylate was hydrolyzed with 20 g water. Subsequently, the resulting precipitation was peptized with approx. 40 g azotic acid (25%), and after this was completely dissolved, 25 g aluminum oxide and 25 g vanadium pentoxide were added and the suspension was stirred until all agglomerates were completely dissolved. This suspension was applied on a formed ceramic body such as, for example, a ceramic tubular membrane with an average pore width of 0.4 μm to a thickness of 20 μm.

After drying and stabilization of the composite, this composite can be used for catalytic oxidation reactions such as, for example, oxidation of $SO_2$ traces to $SO_3$ in waste gases, which subsequently can be eliminated from the waste gas in scrubbers.

EXAMPLE 1.10

A suspension consisting of 25 g tetraethoxysilane in 40 ml ethanol was hydrolyzed and peptized with 5 g hydrochloric acid (30%). After a complete hydrolysis, 60 g of an amorphous microporous mixed oxide system, such as, for example, titanium dioxide-siliciumdioxide-methylsiliciumsesquioxide glass, was added. The suspension was stirred until all agglomerates were dissolved, and the suspension was then sprayed onto a porous inorganic membrane from Altech to a thickness of 60 μm. After drying and stabilization of the composite at 250° C. within 20 minutes, it can be used for catalytic reactions such as the hydroxylation of benzene to phenol with hydrogen peroxide at 60° C. Conversion was 1.15%.

EXAMPLE 1.11

A suspension consisting of 15 g tetraethoxysilane and 10 g aluminum ethanolate in 40 ml ethanol was hydrolized and peptized with 11 g hydrochloric acid (30%). After a complete hydrolysis, 60 g of a zeolite in H-form (CBV600 from Zeolyst) was added. The suspension was only stirred intensively for a short time to avoid destruction of the zeolite, and it was sprayed onto a porous inorganic membrane from Atech to a thickness of 60 μm. After drying and stabilization of the composite at 350° C. within 10 minutes, this composite can be used for acid catalyzed reactions, such as, for example, the etherification of alcohols.

What is claimed is:

1. Catalytically active permeable flexible composite based on at least one perforated and permeable carrier, which contains on at least one side of the carrier and inside the carrier at least one inorganic component, which consists essentially of at least one compound of a metal, a metalloid or a composition metal and at least one element from group III to VII of the periodic system, which permeable flexible composite is obtained by application of a suspension, which contains said at least one inorganic component and a sol, on and inside at least one flexible, perforated and permeable carrier, and stabilizing the suspension by heating the suspension at least once either at a temperature of between 50 and 100° C. for 10 minutes to 5 hours, or at a temperature of between 100 and 800° C. for 1 second to 10 minutes, wherein said composite can be wound on or off a roll.

2. Composite according to claim 1, wherein the composite is permeable for gases, solids or liquids.

3. Composite according to claim 1, wherein the composite is permeable for particles with a size of 0.5 nm to 10 μm.

4. Composite according to claim 1, wherein the perforated and permeable carrier contains gaps with a size of 0.02 to 500 μm.

5. Composite according to claim 1, wherein the carrier contains at least one of the following materials: carbon, metals, alloys, glass, ceramic materials, minerals, plastics, amorphous substances, natural products, composites or at least one combination of these materials.

6. Composite according to claim 1, wherein the carrier was modified with at least one of the following processes: thermal, mechanical and chemical treatment or a combination of these treatment processes.

7. Composite, according to claim 1, wherein the carrier contains at least one metal or one natural fiber or one plastic and has been modified according to at least one mechanical deformation technology.

8. Composite according to claim 7, wherein the at least one mechanical deformation technology is selected from the group consisting of drawing, swaging, milling, stretching and forging.

9. Composite according to claim 1, wherein the carrier contains at least woven or felted or ceramically bound fibers or at least sintered spheres or particles.

10. Composite according to claim 1, wherein the carrier is perforated.

11. Composite according to claim 1, wherein the permeable carrier has been made permeable by laser or ion beam treatment.

12. Composite according to claim 1, wherein tHe carrier contains fibers from at least one of the following materials: carbon, metals, alloys, ceramic materials, glass, minerals, plastics, amorphous substances, natural products, composites or at least one combination of these materials.

13. Composite according to claim 1, wherein the carrier contains at least woven fibers made from metal or alloys.

14. Composite according to claim 1, wherein the carrier contains at least one mesh made from steel.

15. Composite according to claim 1, wherein the carrier contains at least one mesh with a mesh width of 5 to 500 μm.

16. Composite according to claim 1, wherein the carrier contains at least one expanded metal with a mesh width of 5 to 500 μm.

17. Composite according to claim 1, wherein the carrier contains a sintered metal, a sintered glass or a metallic fleece with a pore width of 0.1 to 500 μm.

18. Composite according to claim 1, wherein the carrier contains at least aluminum, silicium, cobalt, manganese, zinc, vanadium, molybdenum, indium, lead, bismuth, silver, gold, nickel, copper, iron, titanium, platinum, stainless steel, steel or brass or an alloy of these materials or a material coated with Au, Ag, Pb, Ti, Ni, Cr, Pt, Pd, Rh, Ru and/or Ti.

19. Composite according to claim 1, wherein said at least one metal, metalloid or composition metal of said at least one compound contains at least one transition element and element of group III to V of the periodic system, or at least one transition element, or at least one element of group III to V of the periodic system, whereby the compounds have a particle size of 0.001 to 25 μm.

20. Composite according to claim 9, wherein the at least one element from group III to VII of the periodic system of said at least one compound contains at least one of the elements Te, Se, S, O, Sb, As, P, N, Ge, Si, C, Ga, Al or B.

21. Composite according to claim 20, wherein the inorganic component contains at least one compound containing at least one of the elements Sc, Y, Ti, Zr, V, Cr, Nb, Mo, W, Mn, Fe, Co, B, Al, In, Tl, Si, Ge, Sn, Pb, Sb or Bi with at least one of the elements Te, Se, S, O, Sb, As, P, N, C, or Ga or at least one of these elements.

22. Composite according to claim 1, wherein the inorganic component contains alumosilicate, aluminum phosphate, zeolite or partially substituted zeolite.

23. Composite according to claim 1, wherein the inorganic component contains amorphous microporous mixed oxides that can contain up to 20% non-hydrolyzable organic compounds.

24. Composite according to claim 1, wherein the composite contains at least two particle size fractions of at least one inorganic component.

25. Composite according to claim 24, wherein the particle size fraction in the composite contains a particle size ratio of 1:1 to 1:100.

26. Composite according to claim 25, wherein the composite contains a quantitative proportion of particle size fraction of between 0.01 to 1 and 1 to 0.01.

27. Composite according to claim 1, wherein the permeability of the composite can be limited to particles of a certain maximum size by the particle size of the inorganic component used.

28. Composite according to claim 1, wherein the suspension containing at least one inorganic component contains at least one liquid from the following: water, alcohol, and acid or a combination of these liquids.

29. Composite according to claim 1, wherein the composite as a catalytically active component contains at least one inorganic material, at least one metal or at least one organo-metallic compound, on the surface of which there are catalytically active centers.

30. Composite according to claim 29, wherein the composite contains a zeolite, silicalite or an amorphous microporous mixed oxide system as a catalytic component.

31. Composite according to claim 29, wherein the composite contains at least one oxide from at least one of the elements Mo, Sn, Zn, V, Mn, Fe, Co, Ni, As, Sb, Pb, Bi, Ru, Re, Cr, W, Nb, Hf, La, Ce, Gd, Ga, In, Tl, Ag, Cu, Li, K, Na, Be, Mg, Ca, Sr and Ba as a catalytically active component.

32. Composite according to claim 29, wherein the composite contains at least titanium suboxide as a catalytically active component.

33. Composite according to claim 29, wherein the composite contains at least one metallic compound as a catalytically active component from compounds of the following metals: Pt, Rh, Ru, Ir, Au, Ag, Os, Re, Cu, Ni, Pd and Co.

34. Composite according to claim 29, wherein the composite contains at least one metal as a catalytically active component from the following metals: Pt, Rh, Ru, Ce, Ir, Au, Ag, Os, Re, Cu, Ni, Pd and Co.

35. Composite according to claim 1, wherein the composite is flexible to a smallest radius of up to 1 mm.

36. Process of preparing the catalytically active, permeable composite as claimed claim 1, comprising applying said suspension on and inside said at least one flexible, perforated and permeable carrier, and stabilizing the suspension by heating the suspension at least once either at a temperature of between 50 and 100° C. for 10 minutes to 5 hours, or at a temperature of between 100 and 800° C. for 1 second to 10 minutes.

37. Process according to claim 36, wherein the suspension is applied onto or into or onto and into at least one carrier by stamping on, pressing on or in, rolling on, applying with a blade or brush, dipping, spraying, or pouring.

38. Process according to claim 36, wherein a perforated and permeable carrier is used that contains one of the following materials: carbon, metals, alloys, glass, ceramic material, minerals, plastics, amorphous substances, natural products, composites or at least one combination of these materials.

39. Process according to claim 36, wherein the suspension that contains at least one inorganic component and at least one metallic oxide sol, at least one metalloid oxide sol or at least one composition metallic oxide sol or a mixture of these sols is produced by suspending at least one inorganic component in at least one of these sols.

40. Process according to claim 36, wherein the suspension contains at least one catalytically active component.

41. Process according to claim 36, wherein, the sols are obtained by hydrolyzing at least one metallic compound, at least one metalloid compound or at least one composition metallic compound with one liquid, one gas or one solid.

42. Process according to claim 41, wherein as a liquid, gas or solid water, water vapor, ice, alcohol or an acid or a combination of these compounds is used for the hydrolysis of the metallic compound.

43. Process according to claim 41, wherein the compound to be hydrolyzed is placed in alcohol or in an acid or a combination of these liquids before hydrolysis.

44. Process according to claim 41, wherein at least one metal nitrate, metal chloride, metal carbonate, one metal alcoholate compound or at least one metalloid alcoholate compound is hydrolyzed.

45. Process according to claim 44, wherein at least one metal alcoholate compound or at least one metalloid alcoholate compound from the alcoholate compounds of the elements Ti, Zr, Al, Si, Sn, Ce and Y or at least one metal nitrate, metal chloride or metal carbonate from the metallic salts from the elements Ti, Zr, Al, Si, Sn, Ce and Y is hydrolyzed.

46. Process according to claim 36, wherein the hydrolysis of the compounds to be hydrolyzed is carried out with at least half the molar ratio of water, in relation to the hydrolyzable group of the hydrolyzable compound.

47. Process according to claim 36, wherein the hydrolyzed compound is treated with at least one organic or inorganic acid.

48. Process according to claim 47, wherein the organic or inorganic acid has a concentration of 10 to 60%.

49. Process according to claim 47, wherein the hydrolyzed compound is treated with at least one mineral acid from the following: azotic acid, sulfuric acid, perchloric acid and hydrochloric acid or a combination of these acids.

50. Process according to claim 47, wherein at least one inorganic component with a particle size of 1 to 10000 nm is suspended in a sol.

51. Process according to claim 50, wherein an inorganic component is suspended that contains at least one compound from the following: metallic compounds, metalloid compounds, composition metallic compounds or metallic mixture compounds with at least one element from group III to VII of the periodic system, or at least one mixture of these compounds.

52. Process according to claim 50, wherein an inorganic component is suspended that contains at least one compound from the oxides of the elements of the transition element groups or the elements from group III to V of the periodic system.

53. Process according to claim 52, wherein the oxides are chosen from oxides from the elements Sc, Y, Ti, Zr, V, Nb, Cr, Mo, W, Mn, Fe, Ce, Co, B, Al, In, Tl, Si, Ge, Sn, Pb and Bi.

54. Process according to claim 36, wherein at least one catalytically active component is added to the sol.

55. Process according to claim 54, wherein at least one catalytically active component contains at least one compound from metallic compounds, metalloid compounds, composition metallic compounds and metallic mixture compounds with at least one element from group III to VII of the periodic system or organic compounds or at least one mixture of these compounds.

56. Process according to claim 36, wherein at least one catalytically active component with a particle size of 1 to 10000 nm is suspended in a sol.

57. Process according to claim 56, wherein at least one catalytically active component contains at least one compound from zeolite, silicalite or amorphous mixed oxide systems.

58. Process according to claim 36, wherein the percentage by mass of the suspended components is 0.1 to 500 times the amount of hydrolyzed compound used.

59. Process according to claim 36, wherein heating is done by means of warmed air, hot air, infrared radiation, microwave radiation, or electrically generated heat.

60. Process according to claim 36, wherein heating is done by means of using the carrier material as electric resistance heating.

61. Process according to claim 36, wherein stabilization of the suspension is obtained by applying the suspension onto or into or onto and into a preheated carrier.

62. Process according to claim 36, wherein at least one carrier is rolled from a roll and—at a speed of 1 m/h to 1 m/s—runs through at least one device that applies the suspension onto or into or onto and into the carrier and through at least one other device that enables the suspension to be stabilized onto or into or onto and into the carrier by heating, and wherein the composite produced in this way is rolled onto a second roll.

63. Process according to claim 36, wherein an unsintered ceramic or inorganic layer is applied to a carrier and stabilized by being heated.

64. Process according to claim 36, wherein the dried and stabilized composite is impregnated with at least one solution containing a metallic salt, the composite treated in this way is dried by heating and the metallic salt that is present in and on or in or on the composite is reduced to a metal.

65. Process according to claim 36, wherein a metallic salt that is present in the composite is reduced to a metal by treating the composite with a reducing agent.

66. Process according to claim 66, wherein the reducing agent used is a hydroboron.

67. Process according to claim 36, wherein a metallic salt that is present in or on or in and on the composite is reduced to a metal by using the composite as an electrode in an electrolysis.

68. A process for the separation of material mixtures comprising filtering material mixtures through the composite of claim 1 to separate components thereof.

69. A process for the separation of liquid mixtures, gas mixtures, mixtures containing at least one liquid and at least one gas, mixtures containing at least one solid and at least one liquid, and mixtures containing at least one gas and at least one solid or at least one liquid or one gas comprising filtering said mixtures through the composite of claim 1 to separate components thereof.

70. A process for pressurized separation comprising filtering a mixture of materials under pressure with the composite of claim 1 to separate components thereof.

71. A process for micro-filtration, ultra-filtration or nano-filtration comprising filtering micro-sized, ultra-sized or nano-sized particle containing mixtures through a membrane of the composite of claim 1 to separate the micro-sized, ultra-sized or nano-sized particles.

72. A process comprising carrying out a catalytic process with the composite of claim 1.

73. A process comprising carrying out a catalytic process with the composite according to claim 1 as a catalyst carrier, whereby an electric field is connected to the catalyst carrier and the catalyst carrier is connected as an anode or a cathode.

74. A process comprising carrying out a catalytic process with the composite according to claim 1 as a catalyst membrane, whereby the catalytic effect of oxygen-ion conducting electrolytes is used that ensues with the oxygen-ion conduction in the electric field.

75. A process comprising carrying out a catalytic process with the composite according to claim 1 as a carrier material for the production of a catalytically active, permeable composite.

76. Catalytically active permeable flexible composite based on at least one perforated and permeable carrier, which contains on at least one side of the carrier and inside the carrier at least one inorganic component, which consists essentially of at least one compound of a metal, a metalloid or a composition metal and at least one element from group III to VII of the periodic system, which permeable flexible composite is obtained by application of a suspension, which contains said at least one inorganic component and a sol, on and inside at least one flexible, perforated and permeable carrier, and stabilizing the suspension by heating the suspension at least once either at a temperature of between 50 and 100° C. for 10 minutes to 5 hours, or at a temperature of between 100 and 800° C. for 1 second to 10 minutes, wherein said composite has a total thickness of not less than about 5 $\mu$m and not more than about 150 $\mu$m.

* * * * *

UNITED STATES PATENT AND TRADEMARK OFFICE
CERTIFICATE OF CORRECTION

PATENT NO.    : 6,299,778 B1
DATED         : October 9, 2001
INVENTOR(S)   : Penth et al.

It is certified that error appears in the above-identified patent and that said Letters Patent is hereby corrected as shown below:

<u>Title page,</u>
Item [30], the Foreign Application Priority Data information should read:

-- [30]        Foreign Application Priority Data

| | | |
|---|---|---|
| Sept. 20, 1997 | (DE)............................... | 197 41 498 |
| Mar. 18, 1998 | (DE)............................... | 198 11 708 |
| Mar. 19, 1998 | (DE)............................... | 198 12 035 |
| May 8, 1998 | (DE)............................... | 198 20 580 |
| Jun 3, 1998 | (DE)............................... | 198 24 666 |

Signed and Sealed this

Twenty-fifth Day of June, 2002

*Attest:*

*Attesting Officer*

JAMES E. ROGAN
*Director of the United States Patent and Trademark Office*